April 6, 1943.  J. R. SKEEN  2,315,552

TREATMENT IN GAS DISTRIBUTION SYSTEM

Filed June 10, 1939

Inventor:—
John R Skeen
by his Attorney
Hugo G Kemman

Patented Apr. 6, 1943

2,315,552

UNITED STATES PATENT OFFICE 2,315,552

TREATMENT IN GAS DISTRIBUTION SYSTEMS

John R. Skeen, Philadelphia, Pa., assignor to The United Gas Improvement Company, a corporation of Pennsylvania Application June 10, 1939, Serial No. 278,500

9 Claims. (Cl. 48—190)

This application is continuation-in-part of my copending application Serial Number 236,822, filed October 24, 1938, and pertains generally to the treatment of the interiors of gas mains or other gas enclosures for the purpose of sealing joints or laying dust, or both.

Systems for the distribution of gas include conduits or mains which are usually laid underground, and which comprise sections of pipe joined together by means of welding, by means of packed joints, by means of screw joints, or otherwise.

The welded joint is a more recent development and is used chiefly to join pipe sections of steel or iron, other than cast iron.

Older mains are usually made up of cast iron pipe sections joined by means of bell and spigot or other similar joints. These joints are usually packed with hemp, jute, flax or other cellulosic material which in turn is backed up with lead or cement or other material in a well known manner.

The lead or cement seal is tight and effective in preventing gas leakage when first applied but soon loses this quality due to expansion and contraction of the main with change in temperature or for other reasons. When this happens the effectiveness of the joint in preventing gas leakage depends entirely upon the packing.

Generally speaking, there are two types of cellulosic packing or yarn which have been used in joints of gas mains or other gas enclosures.

At the time of their insertion in the joint, packing materials may be classified as absorbent and non-absorbent in that the capacity of the former to absorb water has not been impaired by special treatment, whereas such capacity of the latter has been purposely removed such as by treatment with tar.

These widely different types of packing may be referred to as "untarred" and "tarred" respectively, and have widely different characteristics in service. For instance, the untarred type of packing is capable of absorbing water which in turn swells the packing. This capacity continues until partially or wholly impaired by the accumulation of tar, resin and gum formed from constituents in the gas, the tar, resin and gum coating the packing. When this occurs the capacity of the packing to take up and give off moisture with change in gas humidity is considerably reduced and the packing takes on the characteristics of the tarred type.

Until recently, when high pressure distribution has come into more general practice, the bell and spigot or other joints packed with the untarred type of packing gave very little trouble since the gas generally contained sufficient moisture to keep the packing saturated and, therefore, gas-tight.

However, when the gas is compressed to a high pressure for long distance distribution in welded mains before being expanded to low pressure for local distribution, most of the water vapor (and some of the oils) are condensed out. There is then no longer sufficient water vapor in the gas when expanded to the low pressure to keep the fibrous packing in the packed joints in the low pressure mains moist. On the contrary, the gas is so dry that it rapidly draws out any absorbed moisture in the packing at a rate depending somewhat upon the accumulation of tar, resin and gum. However, the packing eventually dries out since the accumulation of tar, resin and gum is rarely capable of sealing moisture in the fibers. It follows that when the packing dries out serious leaks occur.

In other words, as long as the main is used for distributing ordinary manufactured gas, and assuming that the untarred type of packing was originally installed, very little trouble with joint leakage is experienced. However, when the service is changed over to a manufactured gas of lower moisture content, or over to natural gas which is characterized by a very low moisture content, or over to mixtures, the packing dries out and shrinks sufficiently to cause the joint to become leaky.

While the use of the tarred type of packing avoids the absorption of water in the first instance, and consequent drying and shrinking should the moisture content of the gas be lowered, nevertheless, the tarred type of packing has not been wholly successful. This is thought to be due in part to shrinkage in volume or cracking of the tar due to drying or polymerization, and also in part to the necessity of swelling a packing in a joint to cause the packing to conform more exactly to the contour of the joint and to reduce voids between the fibers.

Soap is sometimes applied to the untarred type of packing. Such treatment, however, does not prevent drying and shrinking.

Referring now to the problem of dust, it is to be noted that over a period of years the water condensed from wet gas together with other constituents of the gas such as carbon dioxide, hydrogen sulfide, hydrocyanic acid, naphthalene, and so forth, have in many instances, caused extensive corrosion of the interior walls of the mains. The products of corrosion have accumulated on the walls of the mains and, in many instances, large quantities have become disconnected and have collected along the bottom.

Due to the presence of relatively large quantities of moisture, largely responsible for the corrosion in the first instance, the products of corrosion were maintained in a wet condition and did not tend to form dust in any appreciable quantity.

Therefore, until high pressure distribution came into practice, and while the use of natural gas or natural gas mixtures was less widespread, very little difficulty was experienced with the formation of dust in mains from the products of corrosion.

In other words, as long as a main is used for distributing ordinary wet manufactured gas very little trouble with dust resulting from corrosion is experienced. However, when the service is changed over to a manufactured gas of low moisture content, or over to natural gas or natural gas mixtures which are characterized by very low moisture content, the moisture on and in the corrosion products dries out and such products become a serious source of dust.

The presence of considerable quantities of dust in the gas flowing through the mains of a distribution system, is very undesirable because dust tends to clog up customer service connections, interferes with the proper operation of meters, and tends to clog up burners and pilot outlets.

Under extreme conditions corrosion may be so severe as to form a serious obstruction in the main itself by reducing its effective cross-sectional area such as by the accumulation of dust in piles in the main.

Since the corrosion products comprise not only ordinary iron rust but also a variety of other compounds resulting from the action of hydrogen sulfide, hydrocyanic acid, naphthalene, and other corrosive substances, the problem of wetting down the dust, of wetting the main wall, and of thoroughly spreading a dust laying liquid becomes a major factor.

While the water miscible high boiling alcohols and water miscible organic oils are generally suitable for the purpose of laying dust as described and claimed in copending applications Serial Number 167,316, filed October 4, 1937, and Serial Number 208,729, filed May 18, 1938, both by Duncan B. Williams, and which have matured into Patents 2,167,140 and 2,167,141 respectively, only three of the substances specifically set forth in said applications are capable of swelling cellulosic fibre packing to the same extent as water. With dry jute the volume increase caused by the swelling is 44%.

I have discovered two additional substances namely, monomethyl ether of ethylene glycol and monomethyl ether of diethylene glycol which are capable of swelling cellulosic fibre packing sufficiently to prevent joint leakage as described and claimed in my copending application Serial Number 128,555 filed March 1, 1937, now Patent 2,141,959 issued December 27, 1938.

The percentage swelling of dry jute by a number of liquids is set forth in Tables 1 to 3:

TABLE 1

| Substance | Swelling |
|---|---|
| | Per cent |
| Ethylene glycol | 44 |
| Diethylene glycol | 44 |
| Monomethyl ether of ethylene glycol | 38 |
| Monomethyl ether of diethylene glycol | 44 |
| Glycerine | 44 |

TABLE 2

| Substance | Swelling |
|---|---|
| | Per cent |
| Monobutyl ether of ethylene glycol | 0 |
| Monobutyl ether of diethylene glycol | 0 |
| Monophenyl ether of ethylene glycol | 0 |
| Triethylene glycol | 1 |
| Monoethyl ether of triethylene glycol | 2 |
| Monomethyl amyl ether of ethylene glycol | 4 |
| Monoethyl ether of diethylene glycol | 16 |
| Monoethyl ether of ethylene glycol | 10 |

TABLE 3

| Substance | Swelling |
|---|---|
| | Per cent |
| Mixed tar bases | 0 |
| Hexone | 3 |
| Quinoline | 4 |
| Octyl aldehyde | 8 |
| Decane | 8 |
| Triethyl benzene | 9 |
| Octyl alcohol | 11 |
| Olive oil | 13 |
| Spindle oil | 14 |
| Benzaldehyde | 0 |
| Oleic acid | 3 |
| Benzyl alcohol | 0 |
| Dimethyl cyclic hexanol | 0 |
| Amyl acetate | 4 |
| Diethyl phthalate | 0 |
| Decahydro naphthalene | 13 |

A number of liquids suitable for dust laying are set forth in Table 4.

TABLE 4

Non-cyclic high boiling aliphatic alcohols:
　Ethylene glycol
　Diethylene glycol
　Monoethyl ether of ethylene glycol
　Monomethyl ether of diethylene glycol
　Glycerine
　Monobutyl ether of ethylene glycol
　Monobutyl ether of diethylene glycol
　Triethylene glycol
　Monoethyl ether of triethylene glycol
　Monoethyl ether of diethylene glycol
　Monoethyl ether of ethylene glycol
　Octyl alcohol
　Lauryl alcohol
　Cetyl alcohol
　Propylene glycol
　Dipropylene glycol It should be noted that Table 4 includes not only the liquids of Table 1 which alone are suitable for swelling joint packing, but also liquids of Table 2 as well as others which in themselves are not suitable for swelling joint packing.

All of the substances listed in Table 1 are of relatively low vapor pressure compared to water and are relatively inert in the presence of the gas. Each of them except glycerine is rapidly absorbed by uncoated packing. Highly concentrated glycerine has a viscosity which is somewhat too high for rapid absorption by the packing. This quality, however, may be greatly improved as will hereinafter appear.

Likewise, all of the substances of Table 4 are of low vapor pressure compared to water and are relatively inert in the presence of the gas.

In many distribution systems tar, resin, gum, and dust have been deposited upon the packing and operate to exclude the substances listed in Table 1 from contact with the packing. In the case of packing which was originally tarred, these substances are, of course, also excluded from contact with the packing. The substances of Table 1 are rather deficient as softening or solubilizing agents for tar, resin and gum.

The tar, resin, and gum likewise prevent the materials of Table 4 from reaching and wetting active sources and potential sources of dust, these materials being likewise for the most part deficient as softening or solubilizing agents.

A feature of this invention is to provide an improved leak proofing composition for swelling cellulosic packing in joints of gas distribution systems which possesses sufficient solvent power with respect to tar, resin and gum to cause the swelling constituents of the composition to be absorbed by the packing with sufficient rapidity for practicable purposes.

Another feature of the invention is to provide an improved dust laying composition which possesses sufficient solvent power with respect to tar, resin and gum to cause the dust laying constituents of the composition to wet dust sources and to wet and be absorbed by accumulations of dust with sufficient rapidity for practicable purposes.

Another feature of the invention is to provide a joint sealing and/or dust laying composition having improved wetting qualities not only for tar, resin and gum, but also for cellulosic fibre and the metal of the main walls.

Another feature of the invention is to provide a new article of manufacture and a process for making the same.

Other features of the invention will become more apparent to persons skilled in the art as the specification proceeds.

Generally speaking, the improvement in leak proofing compositions comprises two or more mutually miscible liquids, one of which is especially adapted to be absorbed by the packing and to swell the packing to at least substantially the same extent as water; and the other of which is especially adapted (a) to soften or dissolve tar, resin and/or gum which may cover the packing, and (b) to assist the spreading and climbing of the swelling agent in the joint packing. In the event that these two or more liquids are not in themselves mutually miscible in the quantities employed, a miscibility agent may be added. Such agent may comprise a liquid solvent in which the two or more liquids employed are soluble.

Examples of the first mentioned liquids of the leak proofing composition comprise any one or more of the substances listed in Table 1 such substances being mutually miscible with each other.

Examples of the second mentioned liquid of the leak proofing composition comprise one or more of the following group of substances and mixtures containing the same.

(1) The aromatic alcohols generally, and particularly liquid aromatic alcohols such as benzyl alcohol, alpha phenyl ethyl alcohol, beta phenyl ethyl alcohol, and phenylpropyl alcohol, their homologues and mixtures. Examples of aromatic alcohols which are solid at ordinary temperatures are diphenylcarbinol, and triphenylcarbinol.

The aromatic alcohols are characterized by having one of the hydrogen atoms in the side chain replaced by hydroxyl, whereas in the phenols nuclear hydrogen has been replaced. The aromatic alcohols may also be regarded as aliphatic alcohols in which one of the hydrogens has been replaced by an aryl group. It is the combination of an aryl group with a hydroxyl group which apparently makes the aromatic alcohols particularly effective for my purposes.

Examples of miscibility agents suitable for incorporation in leak proofing compositions to insure a single liquid phase are:

Methyl carbitol (monomethyl ether of diethylene glycol)
Butyl carbitol (monobutyl ether of diethylene glycol)
Phenyl cellosolve (monophenyl ether of ethylene glycol)
Acetone
Diacetone alcohol
Mesityl oxide
Phenyl carbitol (monophenyl ether of diethylene glycol)

Reference is made to my copending application Serial Number 285,942, filed July 22, 1939, in which the employment of main treating liquid mixtures containing a non-cyclic high boiling aliphatic alcohol and monophenyl ether of ethylene glycol (phenyl cellosolve) is described and claimed. Reference is also made to my copending application Serial Number 278,499, filed June 10, 1939, in which the employment of main treating liquid mixtures containing a non-cyclic high boiling aliphatic alcohol and a ketone is described and claimed.

Referring now to dust laying compositions, generally stated, the improvement comprises two or more mutually miscible liquids one of which is adapted to wet, hold and/or bind dust particles and to coat dust sources; and the other of which is adapted (a) to soften or dissolve tar, resin and/or gum which may cover dust sources or form incrustations with dust deposits and (b) to assist the spreading and climbing of the dust laying liquid upon the walls of the gas main and throughout the sources of dust. In the event that these two or more liquids are not in themselves mutually miscible in the quantities employed, a miscibility agent may be added. Such agent may comprise a liquid solvent in which the two or more liquids employed are soluble.

Examples of the first mentioned liquid of the dust laying composition comprise any one or more of the substances listed in Table 4.

Examples of the second mentioned liquid of the dust laying composition are the aromatic alcohols, their homologues and mixtures listed above in connection with the leak proofing composition.

Examples of miscibility agents suitable for incorporation in dust laying compositions to insure a single liquid phase are:

>Methyl carbitol
>Butyl carbitol
>Phenyl cellosolve
>Acetone
>Diacetone alcohol
>Mesityl oxide
>Phenyl carbitol Any desired quantity of my tar, resin and/or gum softening and/or solubilizing and wetting agent (referred to hereinafter and in the claims for convenience as "tar penetrating agent") may be added to the fiber swelling and/or dust laying liquid. I find, for example, that for ordinary purposes from 5% to 20% is sufficient, but in extreme cases such as when the packing is of the tarred type or large quantities of tar, resin and/or gum have deposited from the gas that much larger quantities are preferably employed, for example, up to say 70% or more.

Furthermore, the more drastic treatment or treatments may be followed by a less drastic treatment or treatments, such as the treatment for ordinary purposes.

Moreover, the main may be treated first with the tar penetrating agent and then with the dust laying and/or joint sealing agent without departing from the spirit of of the invention.

The presence of my tar penetrating agent greatly increases the distribution of the treating liquid and its penetration through tar, resin, or gum and dust incrustations and, therefore, not only greatly decreases the time of treatment, but also greatly increases the thoroughness and effectiveness of the treatment when tar, resin, gum and/or dust incrustations are present.

I find that my tar penetrating agents do not interfere with the functions of the other ingredients of the composition, and greatly enhance the spreading and climbing of the same.

Although the aromatic alcohols are not of a particularly corrosive character, if desired, a suitable corrosion inhibitor, such as triethanolamine might be added, of which amounts from 0.5 to 1.5% are examples.

Examples of liquid mixtures for both leak proofing and dust laying are as follows:

Example 1

| | Per cent |
|---|---|
| Diethylene glycol | 65 |
| Glycerine | 15 |
| Benzyl alcohol | 20 |

Example 2

| | Per cent |
|---|---|
| Diethylene glycol | 65 |
| Glycerine | 13.5 |
| Benzyl alcohol | 20 |
| Triethanolamine | 1.5 |

Example 3

| | Per cent |
|---|---|
| Glycerine | 60 |
| Commercial phenyl ethyl alcohol | 40 |

The latter composition is rapidly absorbed by the cellulosic packing, whereas, when glycerine alone is used the rate of absorption is rather slow.

It is to be noted that in the case of high viscosity liquids such as glycerine, my tar penetrating agents also serve to reduce the viscosity thus reducing the time required for the composition to flow through the main when applied in this manner.

The foregoing are examples of liquid mixtures suitable for general leakage treatment. When deposits or coatings of tar, resin and/or gum are excessive the following are more suitable in view of the increased concentration of the tar penetrating agent in the mixture.

Example 4

| | Per cent |
|---|---|
| Glycerine | 30 |
| Benzyl alcohol | 70 |

Example 5

| | Per cent |
|---|---|
| Diethylene glycol | 30 |
| Commercial phenyl ethyl alcohol | 68 |
| Triethanolamine | 2 |

Example 6

| | Per cent |
|---|---|
| Glycerine | 30 |
| Benzyl alcohol | 68 |
| Triethanolamine | 2 |

Example 7

| | Per cent |
|---|---|
| Diethylene glycol | 30 |
| Alpha phenyl ethyl alcohol | 34 |
| Beta phenyl ethyl alcohol | 34 |
| Triethanolamine | 2 |

Example 8

| | Per cent |
|---|---|
| Diethylene glycol | 30 |
| Benzyl alcohol | 22 |
| Alpha phenyl ethyl alcohol | 22 |
| Beta phenyl ethyl alcohol | 24 |
| Triethanolamine | 2 |

Example 9

| | Per cent |
|---|---|
| Diethylene glycol | 25 |
| Glycerine | 25 |
| Benzyl alcohol | 15 |
| Alpha phenyl ethyl alcohol | 15 |
| Beta phenyl ethyl alcohol | 18.5 |
| Triethanolamine | 1.5 |

Generally speaking, any other liquid or combination of liquids of Table 1 may be substituted for diethylene glycol or glycerine in the above examples and any other aromatic alcohol or any combination of such alcohols may be substituted as a tar penetrating agent, preferably using a miscibility agent when necessary to form a single liquid phase, which is preferred to a plurality of liquid phases, although it is conceivable that the latter may be employed without departing from the broad concept of the invention.

Examples of liquid mixtures suited more particularly for dust laying only are as follows:

Example 1

| | Per cent |
|---|---|
| Benzyl alcohol | 20 |
| Monophenyl ether of ethylene glycol | 50 |
| Diethylene glycol | 30 |

Example 2

| | Per cent |
|---|---|
| Benzyl alcohol | 15 |
| Dibutyl phthalate | 75 |
| Monomethyl ether of diethylene glycol | 10 |

*Example 3*

|  | Per cent |
|---|---|
| Commercial phenyl ethyl alcohol | 5 |
| Benzyl alcohol | 15 |
| Propylene glycol | 70 |
| Monobutyl ether of diethylene glycol | 10 |

*Example 4*

|  | Per cent |
|---|---|
| Diethylene glycol | 20 |
| Monophenyl ether of ethylene glycol | 50 |
| Monomethyl ether of diethylene glycol | 10 |
| Alpha phenyl ethyl alcohol | 10 |
| Beta phenyl ethyl alcohol | 10 |

*Example 5*

|  | Per cent |
|---|---|
| Diethylene glycol | 50 |
| Phenyl cellosolve | 20 |
| Diglycol laurate | 10 |
| Benzyl alcohol | 15 |
| Commercial phenyl ethyl alcohol | 5 |

Generally speaking, any other liquid or combination of liquids of Table 4 may be substituted for the dust laying liquid or liquids in the above examples. Likewise, any other aromatic alcohol or any combination of such alcohols may be substituted, preferably using a miscibility agent or other means such as forming an emulsion when necessary to form a single liquid phase, which is preferred to a plurality of liquid phases, although it is conceivable that the latter may be employed without departing from the broad concept of the invention.

The treating liquid may be applied to the interior surface of a pipe section and/or to the packing in a joint before, during or after the assembly of the pipe sections to form the main. This may be accomplished in any desired manner such as by dipping, spraying, brushing, or otherwise.

If the main is already in service, sections of the main may be "blocked off" by means of inflated bags or other means, and the sections then completely filled with the liquid after which the liquid can be drawn off and re-used.

On the other hand, the liquid may be sprayed into the gas by the fogging procedure earlier mentioned so that the packing and/or dust sources absorb the liquid from the gas stream or, in other words, so that the liquid is deposited from the gas stream onto the packing and/or onto the sources of dust.

In another method of application the liquid is introduced into the main at high points and allowed to run by gravity to low points where the excess can be drawn off. An examination of mains treated in this manner shows that my compositions have greatly improved climbing properties.

Another method comprises inserting a long length of hose into the main with a spray at its end, or with a plurality of sprays distributed along its length, and pumping the treating liquid into the hose while withdrawing the hose either continuously or intermittently or otherwise, or while the hose remains stationary.

In the last three methods of application service on the line need not be interrupted. The packing becomes impregnated with the composition and dust sources become coated with the treating liquid. The wetting of finely divided material causes it to be bound together in a mass which prevents it from rising in a dust regardless of the velocity of the gas travelling through the main. The clogging of mains, meters, regulators and appliance is thus effectively prevented.

A typical gas main is illustrated in the drawing in which.

Figure 1:
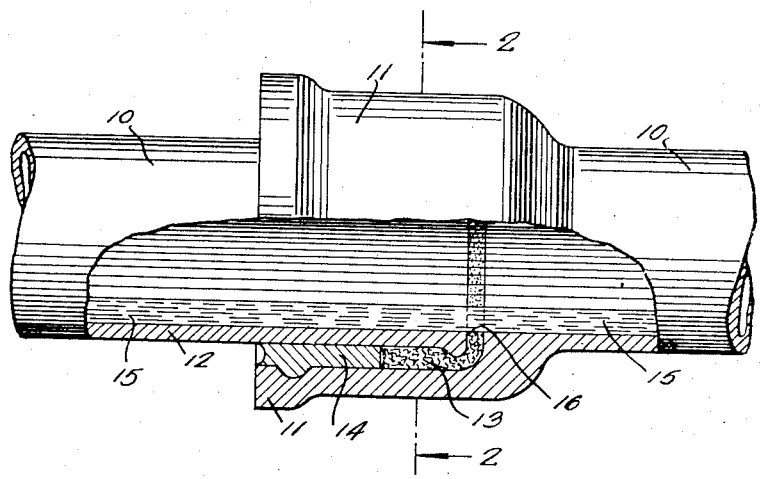
Figure 1 is a side elevation, partly in section, illustrating a gas main.
Figure 2:
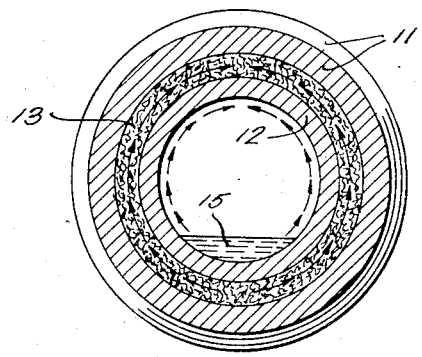
Figure 2 is a cross-section on line 2—2 of Figure 1.

In the drawing the gas main 10 is shown with a joint comprising bell 11 and spigot 12 fitting within said bell and spaced therefrom. In the space between the bell and the spigot is cellulosic fiber packing 13 which may be tarred or untarred, and a seal 14 of lead or other suitable material for holding the packing in place. The treating liquid 15 as illustrated is being run through the main by gravity. It contacts the bottom of the main and any deposits accumulated thereon. It also contacts the packing at space 16 which space is left between the spigot and the shoulder of the bell to provide for expansion and contraction due to temperature changes. The packing absorbs the liquid at 16 and the liquid climbs and is carried up in the packing as shown by the outer group of arrows in Figure 2. If a substance of Table 1 is present the packing is swollen to substantially the same extent as with water. The treating liquid also climbs up the metal walls of the main as illustrated by the inner group of arrows in Figure 2 to coat dust sources in addition to those along the bottom of the main.

The bulk of the treating liquid, of course, remains in the main only during the time that its flow from the point of introduction to the point of removal which usually is the nearest drip.

Any other means for applying the treating liquid to the packing and/or to the interior of the conduit may be employed. For instance, in the case of large diameter mains the level of the liquid 15 may be raised or may be made to fill the entire main if desired, or the spray or fogging methods may be employed.

In the case of a welded main, or other main having joints in which cellulosic fiber packing is not present, the treatment becomes primarily one of dust laying. Likewise, when the liquids of Table 4, other than those of Table 1, are employed the treatment becomes more essentially one of dust laying regardless of the type of main treated.

The terms "comprises" and "comprising" are used in the claims in their usually accepted meaning which do not exclude other steps or the presence of substances other than those specifically recited.

While the invention has been described in connection with gas mains it is to be understood that it is applicable to any part of a gas distribution system wherein similar problems may arise. It is also to be understood that the various agents referred to herein may be used either in the pure or commercially pure form, or in any other suitable form including the commercial and crude forms.

It is to be understood that the above particular description is by way of illustration and that changes, omissions, additions, substitutions, and/or modifications might be made within the scope of the claims without departing from the spirit of the invention.

I claim:

1. A method for treating the interior of a gas distribution system which comprises applying to the interior of said system a liquid mixture comprising a non-cyclic high boiling aliphatic alcohol and at least one of a group consisting of benzyl alcohol, alpha phenyl ethyl alcohol and beta phenyl ethyl alcohol.

2. A method for reducing gas leakage through cellulosic fibrous packing in a joint of a gas distribution system, comprising impregnating said packing with a cellulosic fiber swelling agent selected from a group consisting of ethylene glycol, diethylene glycol, monomethyl ether of ethylene glycol, monomethyl ether of diethylene glycol, and glycerine by bringing said agent into contact with said packing in the presence of one of a group consisting of benzyl alcohol, alpha phenyl ethyl alcohol, and beta phenyl ethyl alcohol.

3. A method for laying dust in the interior of a gas distribution system having dust sources, comprising enveloping said dust sources with a dust laying liquid selected from a group consisting of ethylene glycol, diethylene glycol, monomethyl ether of ethylene glycol, monomethyl ether of diethylene glycol, and glycerine by bringing said liquid into contact with said dust sources in the presence of one of a group consisting of benzyl alcohol, alpha phenyl ethyl alcohol, and beta phenyl ethyl alcohol.

4. A method for rejuvenating cellulosic packing such as jute and hemp in a joint of a gas distribution system to reduce gas leakage at said joint comprising contacting said packing with a liquid mixture comprising benzyl alcohol and at least one of a group consisting of ethylene glycol, diethylene glycol, monomethyl ether of ethylene glycol, monomethyl ether of diethylene glycol, and glycerine.

5. A joint in a gas distribution system comprising spaced cooperating elements, cellulosic fibrous packing such as jute and hemp between said cooperating elements positioned to form a seal, and a liquid mixture absorbed by said packing said liquid mixture comprising at least one of a group consisting of benzyl alcohol, alpha phenyl ethyl alcohol and beta phenyl ethyl alcohol and at least one of a group consisting of ethylene glycol, diethylene glycol, monomethyl ether of ethylene glycol, monomethyl ether of diethylene glycol, and glycerine.

6. A joint in a gas distribution system comprising a bell, a spigot positioned within and spaced from said bell to form an annular space, an annular ring of cellulosic fibrous packing in said annular space and continuously contacting said bell and spigot on its outer and inner peripheries respectively, and a liquid mixture absorbed by said packing, said liquid mixture comprising at least one of a group consisting of ethylene glycol, diethylene glycol, monomethyl ether of ethylene glycol, monomethyl ether of diethylene glycol, and glycerine and at least one of a group consisting of benzyl alcohol, alpha phenyl ethyl alcohol, and beta phenyl ethyl alcohol.

7. A method for treating the interior of a gas distribution system which comprises applying to the interior of said system a liquid mixture comprising a non-cyclic high boiling aliphatic alcohol, and an aromatic alcohol.

8. A gas conduit having interior dust sources wetted down with a liquid mixture comprising a non-cyclic high boiling aliphatic alcohol, and an aromatic alcohol.

9. A joint in a gas distribution system comprising spaced cooperating elements, cellulosic fibrous packing such as jute and hemp between said cooperating elements positioned to form a seal, and a liquid mixture absorbed by said packing, said liquid mixture comprising an aromatic alcohol, and at least one of a group consisting of ethylene glycol, diethylene glycol, monomethyl ether of ethylene glycol, monomethyl ether of diethylene glycol, and glycerine.

JOHN R. SKEEN.